(12) United States Patent
Ouvrard et al.

(10) Patent No.: US 8,287,950 B2
(45) Date of Patent: *Oct. 16, 2012

(54) ORGASOL SYNTHESIS METHOD WITH LARGE GRAIN SILICA

(75) Inventors: Thierry Ouvrard, Poey de Lescar (FR); Thierry Senninger, Paris (FR); Karine Loyen, Pont-Audemer (FR); Holger Senff, Saint Germain en Laye (FR)

(73) Assignee: Arkema France, Colombes (FR)

( * ) Notice: Subject to any disclaimer, the term of this patent is extended or adjusted under 35 U.S.C. 154(b) by 1184 days.

This patent is subject to a terminal disclaimer.

(21) Appl. No.: 11/719,153

(22) PCT Filed: Nov. 10, 2005

(86) PCT No.: PCT/FR2005/002810
§ 371 (c)(1), (2), (4) Date: May 11, 2007

(87) PCT Pub. No.: WO2006/051222
PCT Pub. Date: May 18, 2006

(65) Prior Publication Data
US 2009/0075081 A1    Mar. 19, 2009

(30) Foreign Application Priority Data

Nov. 12, 2004 (FR) ............................ 04 12029

(51) Int. Cl.
*B05D 7/00* (2006.01)
(52) U.S. Cl. ........ 427/212; 427/215; 427/220; 428/402; 428/403; 524/492; 524/495

(58) Field of Classification Search .................. 524/492, 524/495; 428/402, 403; 427/212, 215, 220
See application file for complete search history.

(56) References Cited

U.S. PATENT DOCUMENTS

| | | | |
|---|---|---|---|
| 3,856,742 A | | 12/1974 | Hoppe et al. |
| 4,694,063 A | * | 9/1987 | Hilaire et al. ................ 528/315 |
| 4,831,061 A | | 5/1989 | Hilaire et al. |
| 4,927,860 A | | 5/1990 | Hilaire et al. |
| 6,146,762 A | | 11/2000 | D'Herbecourt et al. |
| 6,245,281 B1 | * | 6/2001 | Scholten et al. ............. 264/497 |
| 2002/0082382 A1 | * | 6/2002 | Le Crom et al. ............. 528/274 |
| 2004/0138363 A1 | * | 7/2004 | Baumann et al. ............ 524/413 |
| 2005/0187446 A1 | * | 8/2005 | Nordstrom et al. .......... 600/323 |
| 2005/0197446 A1 | | 9/2005 | Loyen et al. |

FOREIGN PATENT DOCUMENTS
EP      A0192515    *  8/1986

* cited by examiner

*Primary Examiner* — Leszek Kiliman
(74) *Attorney, Agent, or Firm* — RatnerPrestia

(57) ABSTRACT

The invention relates to a method for obtaining polyamide or copolyamide particles which are spheroidal and whose average diameter is between 40 and 150 μm, preferably between 60 and 100 μm. Said method consists of introducing a mineral charge, preferably silica, having an average diameter of 1-30 μm into the reaction mixture. The invention also relates to a polyamide or copolyester amide powder and to the use thereof in order to manufacture coatings, ink compositions, paint compositions, cosmetic compositions, pharmaceutical compositions, alloys with metal powders or metal oxide powders and parts by agglomerating said powder by laser sintering, IR radiation or UV radiation.

18 Claims, 1 Drawing Sheet

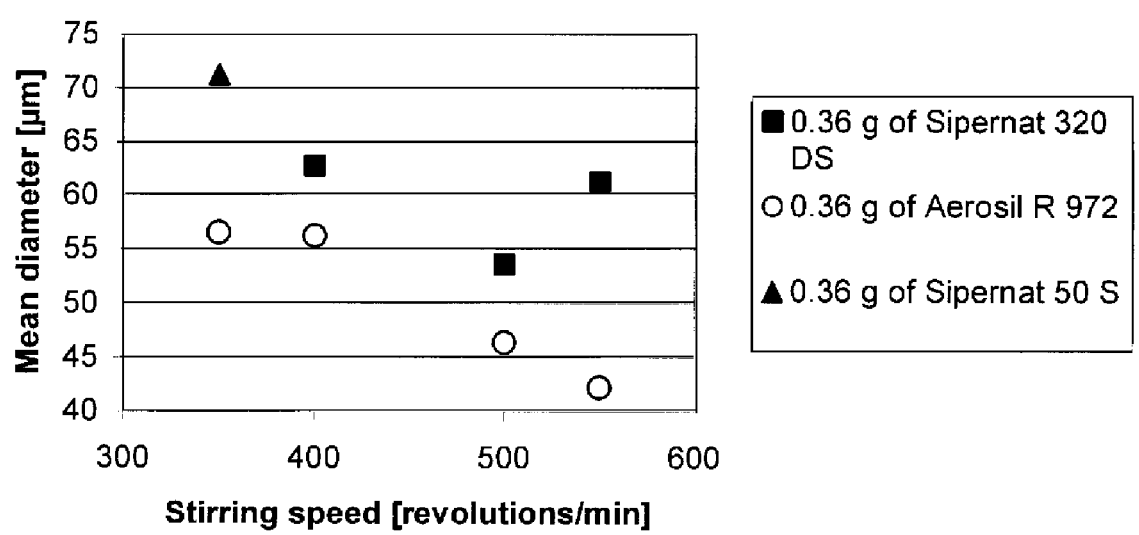

ORGASOL SYNTHESIS METHOD WITH LARGE GRAIN SILICA

This application claims benefit, under U.S.C. §119 or §365 of PCT application PCT/FR05/002810 filed Nov. 10, 2005 and French application number FR 04.12029 filed Nov. 12, 2004.

FIELD OF THE INVENTION

The present invention relates to the field of polyamide resins as a powder with a mean diameter of between 40 µm and 150 µm, preferably between 60 and 100 µm, the particle size distribution of which is narrow, and more particularly to those existing in the form of spheroidal particles, that is to say, particles in the form of spheroids, a spheroid being an approximately spherical solid.

Polyamide powders and in particular those existing in the form of spheroidal particles are used for the coating of substrates, in particular metal substrates (coil coating), in solid or liquid ink and paint compositions and in cosmetic and/or pharmaceutical formulations. Just like all polyamide resins, these powders exhibit high chemical resistance with respect to many products, in particular organic compounds, such as aldehydes, ketones, esters, fats or hydrocarbons, and excellent mechanical properties (resistance to rubbing, to impacts, to abrasion).

BACKGROUND OF THE INVENTION

One process for synthesizing perfectly spherical polyamide-12 powders consists in dissolving lauryllactam at 140° C. in a liquid paraffin comprising potassium stearate and in then initiating the polymerization by adding potassium lactamate and phosphorus trichloride (J61-233.019 and J72-024.960). This method is adapted to the synthesis of perfectly spherical powders formed of copolyamides obtained from lauryllactam and from one or more other lactams, such as caprolactam (J72-025.157). The powders obtained by this process have virtually no porosities.

The industrial preparation of porous polyamide particles, in particular spheroidal porous polyamide particles, with a narrow particle size distribution by anionic polymerization of lactam(s) in suspension (FR 1 213 993, FR 1 602 751) or in solution (DE 1 183 680) in an organic liquid is known. The processes described in these patents make it possible to directly obtain polyamide particles, which separate by themselves from the liquid medium as they are formed. The organic solvents employed for the anionic polymerization are generally chosen from aliphatic and/or aromatic hydrocarbons, alone or as a mixture (for example, hydrocarbon fractions), their boiling range generally lying between 140 and 170° C. The lactam or the mixture of lactams is initially completely dissolved in the solvent or the mixture of solvents in the presence of other ingredients, such as, for example, an inorganic or organic filler. As is taught in patents FR 1 213 993, FR 1 521 130 and EP 192 515, the mean diameter of the particles is regulated using processing parameters which are the stirring speed, the measured addition in successive portions of the reactants or the weight of filler introduced. As taught in patents EP 303 530 and EP 192 515, the filler which is added acts as crystallization seeds.

For some applications, such as, for example, for coil coating, it is necessary to obtain polyamide or copolyesteramide particles having a mean diameter of greater than 40 µm, indeed even of greater than 60 µm. We have tested finely divided fillers which generate crystalline seeds (example: pyrogenic silica) under the conditions of EP 192 515 while reducing the stirring speed and/or while reducing the amount of seeds introduced. However, these actions do not make it possible to reproducibly obtain particles with a diameter of greater than 40 µm and it appears to be virtually impossible to obtain particles with a diameter of greater than 60 µm. In this case, the stirring speed cannot be reduced excessively severely as it is necessary to ensure, in spite of everything, that the reaction medium is homogeneous. The reduction in the amount of filler does not make it possible either to increase the diameter as impurities, which certainly act as disrupting seeds, may be present in an excessively large amount in the reaction medium.

The applicant company has found that, in order to solve this technical problem and to obtain polyamide or copolyesteramide particles with a narrow particle size distribution and with a mean diameter of between 40 and 150 µm, preferably between 60 and 100 µm, it is necessary to introduce, into the polymerization medium, an inorganic filler with a mean diameter of between 1 and 30 µm, preferably between 2 and 20 µm, advantageously between 3 and 11 µm and more advantageously still between 4 and 8 µm.

Thus, the introduction of said filler makes it possible to reduce the effect of the impurities which would be present in the reaction medium and makes it possible to avoid an excessively severe reduction in the stirring speed. This type of inorganic filler thus ensures the production of polyamide or copolyesteramide particles with a mean diameter of greater than 40 µm, preferably of greater than 60 µm.

Patent EP 192 515 describes a process for the production of polyamide particles by an anionic polymerization of lactam (s) in solution in the presence of a finely divided organic or inorganic filler. The filler can be finely divided and dehydrated silica.

Patent EP 303 530 describes a process for the production of polyamide particles with a mean diameter of between 1 and 20 µm by an anionic polymerization of lactam(s) in a solvent in which the lactam(s) is in a state of supersaturation. It is possible to introduce, into the reaction medium, crystallization seeds which are provided in the form of a finely divided filler which can be silica or talc.

In patent FR 1 601 195, the polymerization of the lactam in solution is carried out in the presence of a preformed polyamide powder.

In patent FR 1 213 993, the polymerization of the lactam in solution is carried out without agglomeration of the polyamide on the walls of the reactor in the presence of a preformed polyamide powder. Pigments, such as carbon black or titanium dioxide, can also be added initially.

In all these patents, the filler which is introduced into the polymerization medium is composed of finely divided inorganic particles or of polyamide powder.

Patent EP 1 172 396 describes a process for the production of copolyesteramide particles by copolymerization of two lactams and of a lactone in the presence of a finely divided inorganic or organic filler, the mean diameter of which is between 0.01 and 10 µm.

None of these documents describes that the use of an inorganic filler with a mean diameter of between 1 and 30 µm makes it possible to obtain polyamide or copolyesteramide particles with a mean diameter of between 40 and 150 µm.

SUMMARY OF THE INVENTION

The invention relates to a process for the production of polyamide or copolyesteramide powder particles with a mean diameter of between 40 and 150 µm, preferably between 60 and 100 μm, by anionic polymerization of at least one polymerizable monomer which consists in introducing, into the reaction medium, an inorganic filler with a mean diameter of between 1 and 30 μm.

According to one embodiment, the polyamide or copolyesteramide particles have a mean diameter of between 60 and 100 μm.

According to one embodiment, the polyamide or copolyesteramide particles have a spheroidal shape.

According to one embodiment, the mean diameter of the inorganic filler is between 2 and 20 μm.

According to one embodiment, the mean diameter of the inorganic filler is between 3 and 11 μm.

According to one embodiment, the mean diameter of the inorganic filler is between 4 and 8 μm.

According to one embodiment, the inorganic filler is chosen from silicas, aluminosilicates, aluminum oxides or alumina and/or titanium dioxide.

According to one embodiment, the inorganic filler is a silica.

According to one embodiment, the silica is chosen from the silicas manufactured according to a precipitation process.

According to one embodiment, the silica is chosen from the silicas sold under the trade name Sipernat® 320 DS or Sipernat® 50 S from Degussa or from the silicas sold under the trade name Syloid® 807, Syloid® ED2 or Syloid® ED5 from Grace.

According to one embodiment, the ratio by weight of the inorganic filler with respect to the polymerizable monomer(s) is between 10 and 50 000 ppm, preferably between 100 and 20 000 ppm and advantageously between 100 and 15 000 ppm.

According to one embodiment, the polymerizable monomer or monomers is or are chosen from lauryllactam, caprolactam, enantholactam and capryllactam.

According to an embodiment, the polyamide particles are made of polyamide 12, polyamide 6 or polyamide 6/12.

According to one embodiment, a mixture of monomers comprising, in molar %, the total being 100%:
  from 1 to 98% of a lactam chosen from lauryllactam, caprolactam, enantholactam and capryllactam;
  from 1 to 98% of a lactam, other than the above, chosen from lauryllactam, caprolactam, enantholactam and capryllactam;
  from 1 to 98% of a lactone chosen from caprolactone, valerolactone and butyrolactone,
is polymerized.

According to one embodiment, at least one N,N'-alkylenebisamide is added to the reaction medium.

According to one embodiment, use is made, as solvent, of a paraffinic hydrocarbon fraction, the boiling range of which is between 120 and 170° C., preferably between 140 and 170° C.

The invention also relates to a polyamide powder or to a copolyesteramide powder capable of being obtained according to the process described above.

The invention also relates to the use of a powder defined above for manufacturing: coatings, ink compositions, paint compositions, cosmetic compositions, pharmaceutical compositions, alloys with metal powders, alloys with metal oxide powders or articles by agglomeration of said powder by melting brought about by a laser beam (laser sintering), IR radiation or UV radiation.

According to one embodiment, a powder as defined above is used to manufacture a coating for a metal substrate, such as a coating for a stainless steel or aluminum sheet, or a coating for a plastic substrate.

According to one embodiment, a powder as defined above is used to manufacture a plastic magnet.

BRIEF DESCRIPTION OF THE DRAWINGS

FIG. 1: Is a plot showing that using the process of the invention with an inorganic filler, polyamide 12 particles with a greater mean diameter are produced compared with a finely divided filler.

The invention will now be described in more detail.

The Inorganic Filler

As regards the inorganic filler, the latter is chosen from silicas, aluminosilicates, aluminum oxides or alumina, or titanium dioxides, it can also be a mixture of these inorganic fillers.

Preferably, the inorganic filler is a silica. Mention will be made, without implied limitation, of the silicas sold by:

Degussa under the trade names Sipernat® 160, Sipernat® 310, Sipernat® 320, Sipernat® 320 DS, Sipernat® 325C, Sipernat® 350, Sipernat® 360, Sipernat® 383 DS, Sipernat® 500LS, Sipernat® 570, Sipernat® 700, Sipernat® 22 LS, Sipernat® 50 S, Sipernat® D 10, Sipernat® D 17, Sipernat® C600, Sipernat® C630, Sipernat® 820A, Sipernat® 850, Sipernat® 880, Sipernat® 44, Sipernat® 44MS, Sident® 8, Sident® 9, Sident®10, Sident® 22S, according to the commercial brochure from Degussa entitled "SIPERNAT Fällungskieselsäuren und Silikate".

BASF under the trade names: silica pigments San-Sil® CG-102, San-Sil® AN-102 and San-Sil® BD-73.

Grace: Syloid® C809, Syloid® C810, Syloid® C812, Syloid® ED2, Syloid® ED5, according to the commercial brochure from Grace relating to the technical data for the Syloid® products and entitled "Matting agents for coatings and inks".

Huber: Zeosyl® T166, Zeosyl® T80, Zeolex® 7 according to the technical brochure from Huber entitled "Anticaking and free flow agents, dispersants, carriers process aids".

Ineos: Gasil® HP210, Neosil® CL2000.

PPG: Lo-vel® 275, Lo-vel® 27, Lo-vel® 2003, Lo-vel® 2000, Lo-vel® 28, Lo-vel® 29, Lo-vel® 275, Lo-vel® 39A, Lo-vel® HSF, Lo-vel® 271 PC.

PRhodia, under the Tixosil® 34K, Tixolex® 28, Tixolex® 17 range.

Among these silicas, precipitated silicas are preferred. Those sold under the trade names Sipernat® 320 DS, Sipernat® 50 S and Syloid® ED5 are very particularly preferred but are not limiting.

In the case of a mixture of inorganic fillers mentioned above, it is possible to find, by way of examples, a mixture of different silicas, a mixture of a silica and of an alumina or also a mixture of a silica and of titanium dioxide.

The Polymerizable Monomer or Monomers

The polymerizable monomer or monomers used in the invention is or are chosen from lactams, such as, for example, lauryllactam, caprolactam, enantholactam, capryllactam or their mixtures. Preferably, lauryllactam alone, caprolactam alone or their mixture is used.

It is also possible to envisage the copolymerization of several lactams with a lactone, resulting in a copolyesteramide, as described in patent EP 1 172 396. In this case, a mixture comprising, in molar %, the total being 100%:

from 1 to 98% of a lactam chosen from lauryllactam, caprolactam, enantholactam and capryllactam;

from 1 to 98% of a lactam other than the first chosen from lauryllactam, caprolactam, enantholactam and capryllactam;

from 1 to 98% of a lactone chosen from caprolactone, valerolactone and butyrolactone, is copolymerized.

In the case of a copolyesteramide, use is advantageously made of caprolactam, lauryllactam and caprolactone in the "following respective" proportions (molar %): 30-46%, 30-46% and 8-40% (the total being 100%).

Preferably, the process applies to lactams and to their mixtures, rather than to mixtures of several lactams and of a lactone.

The Polymerization

As regards the anionic polymerization which is carried out to produce the polyamide or copolyesteramide particles, this polymerization is carried out in a solvent.

The Solvent

The solvent used dissolves the monomer or monomers but not the polymer particles which are formed during the polymerization. Examples of solvent are given in patent EP 192 515. Advantageously, the solvent is a paraffinic hydrocarbon fraction, the boiling range of which is between 120 and 170° C., preferably between 140 and 170° C.

The solvent can be supersaturated with monomer(s) at the initiation temperature, that is to say at the temperature at which the polymerization begins. Various means make it possible to supersaturate the solvent with monomer(s). One of these means can consist in saturating the solvent with monomer(s) at a temperature greater than the initiation temperature and in then lowering the temperature to the initiation temperature. Another means can consist in substantially saturating the solvent with monomer(s) at the initiation temperature and in then adding, still at this temperature, a primary amide preferably comprising from 12 to 22 carbon atoms, such as, for example, oleamide, N-stearamide, erucamide or isostearamide, or else an N,N'-alkylenebisamide, examples of which are given later.

It is also possible to carry out the polymerization in a solvent which is not supersaturated with monomer(s). In this case, the reaction medium comprises the monomer or monomers dissolved in the solvent at a concentration far from supersaturation at the initiation temperature. Preferably, the polymerization is carried out according to the invention in a solvent which is not supersaturated with monomer(s).

The Catalyst

A catalyst chosen from normal catalysts for the anionic polymerization of lactams is used. It is a base which is sufficiently strong to result in a lactamate after reaction with the lactam or the mixture of lactams. A combination of several catalysts can be envisaged. Mention may be made, as non-limiting examples, of sodium hydride, potassium hydride, sodium, sodium methoxide and/or sodium ethoxide. The amount of catalyst(s) introduced can generally vary between 0.5 and 3 mol per 100 mol of monomer(s).

The Activator

An activator, the role of which is to bring about and/or accelerate the polymerization, is also added. The activator is chosen from lactams-N-carboxyanilides, (mono)isocyanates, polyisocyanates, carbodiimides, cyanamides, acyllactams and acylcarbamates, triazines, ureas, N-substituted imides, phosphorus trichloride and esters. It can optionally also be a mixture of several activators. The activator can also optionally be formed in situ, for example, by reaction of an alkyl isocyanate with the lactam to give an acyllactam.

The catalyst/activator molar ratio is between 0.2 and 2, preferably between 0.8 and 1.2.

The Fillers or Additives

It is also possible to add, to the reaction medium, any type of filler (pigments, dyes) or additive (antioxidants, UV stabilizers, plasticizers, and the like), provided that all these compounds are thoroughly dry and inert with respect to the reaction medium.

It is also possible to advantageously add at least one N,N'-alkylenebisamide as indicated in EP 192 515, the amount of N,N'-alkylenebisamide(s) introduced generally being of the order of 0.001 to 4 mol per 100 mol of monomer(s). Mention may be made, among the particularly recommended N,N'-alkylenebisamides, of the N,N'-alkylenebisamides of fatty acids and better still:

N,N'-ethylenebisstearamide of formula $C_{17}H_{35}$—$C(=O)$—NH—$CH_2CH_2$—NH—$C(=O)$—$C_{17}H_{35}$.

N,N'-ethylenebisoleamide of formula $C_{17}H_{33}$—$C(=O)$—NH—$CH_2CH_2$—NH—$C(=O)$—$C_{17}H_{33}$.

N,N'-alkylenebispalmitamide, N,N'-alkylenebis-gadoleamide, N,N'-alkylenebiscetoleamide and N,N'-alkylenebiserucamide.

The Process

The anionic polymerization is carried out continuously or else, preferably, batchwise. When carried out batchwise, the solvent is introduced and then, simultaneously or successively, the monomer or monomers, optionally an N,N'-alkylenebisamide, the inorganic filler, the catalyst and the activator are introduced. It is recommended to introduce first the solvent and the monomer or monomers, then to remove any trace of water, for example using azeotropic distillation, and then to add the catalyst once the medium is anhydrous. The inorganic filler can be introduced, for example, after the introduction of the monomer or monomers. It can be advantageous, in order to prevent solidification from occurring or in order to prevent loss of control of the polymerization, to introduce the activator not all at once but incrementally or else at a given rate of introduction.

The polymerization is carried out at atmospheric pressure or else under a slightly greater pressure (partial pressure of the hot solvent) and at a temperature between 20° C. and the boiling point of the solvent. The initiation temperature and the temperature for polymerization of the lactams is generally between 70 and 150° C., preferably between 80 and 130° C.

The ratio by weight of the inorganic filler to the monomer or monomers introduced is generally between 10 and 50 000 ppm, preferably between 100 and 40 000 ppm, more preferably still between 100 and 20 000 ppm, advantageously between 100 and 15 000 ppm and very advantageously between 100 and 10 000 ppm.

The particles of polyamide or copolyesteramide powder according to the invention additionally exhibit the advantage of being porous, which makes it possible to obtain a particularly advantageous absorbability, for example in cosmetic and/or pharmaceutical formulations or in paints.

The polyamide or copolyesteramide powders according to the invention and in particular of those having particles of spheroidal shape can advantageously be used for coatings for substrates, in particular in solid or liquid ink and paint compositions, and in cosmetic and/or pharmaceutical formulations. For the coating of substrates, more particularly of metal substrates, they are particularly recommended in processes of coil coating type (inline coating of a stainless steel or aluminum sheet).

They can also be used as additive in the coatings of metal containers (for example, cans) or containers made of aluminum (cans of food) denoted by the generic name of can coating.

They can also be used as additives in the coatings for plastic substrates by a process involving crosslinking by UV radiation, in order to give a grainy or textured effect to the surface of the substrate.

They can also advantageously be used as binders for the agglomeration of metal powders or of metal oxide powders. In the latter case, the parts obtained are referred to as plastic magnets and are used in miniature electrical motors.

These powders can also be used in the context of the process for the manufacture of objects by melting brought about by a laser beam (laser sintering), IR radiation or UV radiation. The laser sintering technique is described in patent application EP 1 571 173 of the applicant company.

The copolyesteramide powders according to the invention have a melting point between 80 and 220° C. They can be used in particular in release paper or else in cosmetic compositions.

Examples of the invention will now be given.

EXAMPLES

Fillers Used

Characteristics according to the technical data sheets or analyses of the suppliers:

Sipernat® 320 DS: precipitated silica with a mean diameter of 5 μm (according to ASTM C 690-1992), exhibiting a specific surface of 175 m$^2$/g (ISO 5794-1), an oil absorption of 235 g/100 g (DIN 53601) and a pH of 6.3 (5% in water, ISO 787-9).

Sipernat® 50 S: precipitated silica with a mean diameter of 7.5 μm (according to ASTM C 690-1992), exhibiting a specific surface of 450 m$^2$/g (ISO 5794-1) and an absorption of 325 g/100 g (DIN 53601).

Aerosil® R 972: hydrophobic fumed silica with a pH of between 3.6 and 4.4, composed of individual primary particles with a diameter of 16 nm, which have a tendency to agglomerate into larger particles, and with a specific surface of 110 m$^2$/g (ISO 5794-1). This silica was subjected to a hydrophobic treatment using dimethylsilyl or trimethylsilyl groups.

Syloid® ED5: silica with a mean diameter of 8.4-10.2 μm (Malvern method Q013 from Grace Davison), without surface treatment and with a pH of between 6.0 and 8.5 (DIN EN ISO 787-9).

Syloid® ED2: silica with a mean diameter of 3.9-4.7 μm (Malvern method Q013 from Grace Davison), without surface treatment and with a pH of between 6.0 and 8.5 (DIN EN ISO 787-9).

Syloid® C807: silica with a mean diameter of 6.7-7.9 μm (Malvern method Q013 from Grace Davison), without surface treatment and with a pH of between 2.9 and 3.7 (DIN EN ISO 787-9).

Example 1

2800 ml of White® D25 solvent (hydrocarbon fraction supplied by Districhimie), 899 g of dry lauryllactam (lactam-12), 14.4 g of N,N'-ethylenebisstearamide (EBS) and 0.36 g of silica with a mean diameter of 5 μm, sold by Degussa under the name Sipernat® 320 DS, are successively introduced into a 5 liter metal reactor equipped with a paddle stirrer, a jacket in which heating oil circulates, a system for emptying via the bottom, a lock chamber for introducing the reactants and a device for vacuum azeotropic distillation, which reactor is swept by a stream of dry nitrogen.

The reaction mixture is stirred at a speed of 550 revolutions/min and then gradually heated from ambient temperature to 110° C. over 30 min. 290 ml of solvent are distilled off under a vacuum of 2.66×10$^4$ Pa in order to azeotropically entrain any trace of water. The reactor, still with stirring, is brought back to atmospheric pressure and the temperature is brought back to 105° C. 1.44 g of 60% by weight sodium hydride dispersed in oil are then introduced and the stirring is reduced to 500 revolutions/min for 30 min.

27.6 q of stearyl isocyanate (SIC) are continuously injected over 3 h and then the mixture is brought to 110° C. for 1 h.

The reaction mixture is cooled to 80° C. and exists in the form of a slurry which is drawn off via the bottom of the reactor and which comprises the solvent, the unreacted starting reactants and the polyamide-12 powder formed.

After filtering off and drying, a polyamide-12 powder is obtained which is composed of spheroidal particles.

Example 2

Comparative

The operating conditions of example 1 are repeated but while replacing the Sipernat® 320 DS silica with ultrafine silica (with a mean diameter of 16 nm) sold under the trade name Aerosil® R 972 by Degussa.

After filtering off and drying, a polyamide-12 powder is obtained which is composed of spheroidal particles. A DSC analysis according to standard ISO 11357-3 of the powder obtained gives the following results:

Melting point: M.p.=177.6° C.;
Enthalpy of fusion ΔH=104 J/g.

Example 3

Comparative

The operating conditions of example 2 are repeated but with a stirring speed of 550 revolutions/min during the injection of SIC.

After filtering off and drying, a polyamide-12 powder is obtained which is composed of spheroidal particles.

Example 4

The operating conditions of example 3 are repeated but while introducing 0.36 g of Sipernat® 320 DS silica into the reaction medium instead of the Aerosil® silica.

After filtering off and drying, a polyamide-12 powder is obtained which is composed of spheroidal particles.

Example 5

The operating conditions of example 1 are repeated but while introducing 0.72 g of Sipernat® 320 DS silica into the reaction medium instead of 0.36 g. The operating conditions of example 1 are repeated but the injection of SIC takes place over 160 min with a stirring speed of 450 revolutions/min.

After filtering off and drying, a polyamide-12 powder is obtained which is composed of spheroidal particles.

Example 6

The operating conditions of example 5 are repeated but while replacing the Sipernat® 320 DS silica with the Sipernat® 50S silica.

After filtering off and drying, a polyamide-12 powder is obtained which is composed of spheroidal particles.

Example 7

Comparative

The operating conditions of example 2 are repeated but, during the injection of SIC, the stirring speed is 400 revolutions/min.

After filtering off and drying, a polyamide-12 powder is obtained which is composed of spheroidal particles.

Example 8

The operating conditions of example 7 are repeated but while introducing 0.36 g of Sipernat® 320 DS silica into the reaction medium instead of Aerosil® R972.

After filtering off and drying, a polyamide-12 powder is obtained which is composed of spheroidal particles.

Example 9

Comparative

The operating conditions of example 2 are repeated but, during the injection of SIC, the stirring speed is 350 revolutions/min.

After filtering off and drying, a polyamide-12 powder is obtained which is composed of spheroidal particles. The stirring speed, although reduced in comparison with example 2, does not make it possible to obtain a mean diameter of greater than 60 μm.

Example 10

The operating conditions of example 9 are repeated but while introducing 0.36 g of Sipernat® 50 S silica into the reaction medium instead of the Aerosil® R972.

After filtering off and drying, a polyamide-12 powder is obtained which is composed of spheroidal particles.

Example 11

2800 ml of White® D25 solvent (hydrocarbon fraction supplied by Districhimie), 899 g of dry lauryllactam (lactam-12), 7.2 g of N,N'-ethylenebisstearamide (EBS) and 0.36 g of silica with a mean diameter of 5 μm, sold by Degussa under the name Sipernat® 320 DS, are successively introduced into a 5 liter metal reactor equipped with a paddle stirrer, a jacket in which heating oil circulates, a system for emptying via the bottom, a lock chamber for introducing the reactants and a device for vacuum azeotropic distillation, which reactor is swept by a stream of dry nitrogen.

The reaction mixture is stirred at a speed of 300 revolutions/min and then gradually heated from ambient temperature to 110° C. over 30 min. 290 ml of solvent are distilled off under a vacuum of $2.66 \times 10^4$ Pa in order to azeotropically entrain any trace of water. The reactor, still with stirring, is brought back to atmospheric pressure. 1.44 g of 60% by weight sodium hydride dispersed in oil are then introduced and the stirring is increased to 400 revolutions/min. The temperature is brought back to 100.4° C. over 60 min and stirring is continued at this temperature for 30 min.

28.4 g of stearyl isocyanate mixed with 124 g of White® D25 solvent are continuously injected over 1 h with a flow rate of 57.4 g/h and over 132 min with a flow rate of 43.2 g/h.

The mixture is then brought to 120° C. over 1 h after the beginning of injection of the SIC. At the end of the injection, the temperature is maintained at 120° C. for 2 h.

The reaction mixture is cooled to 80° C. and exists in the form of a slurry which is drawn off via the bottom of the reactor and which comprises the solvent, the unreacted starting reactants and the polyamide-12 powder formed.

After filtering off and drying, a polyamide-12 powder is obtained which is composed of spheroidal particles. A DSC analysis according to standard ISO 11357-3 of the powder obtained gives the following results:

Melting point: M.p.=183.7° C.;
Enthalpy of fusion ΔH=105 J/g

Example 12

Comparative

The operating conditions of example 11 are repeated but while replacing the Sipernat® 320 DS silica with ultrafine silica (with a mean diameter of 16 nm) sold under the trade name Aerosil® R 972 by Degussa.

After filtering off and drying, a polyamide-12 powder is obtained which is composed of spheroidal particles. A DSC analysis according to standard ISO 11357-3 of the powder obtained gives the following results:

Melting point: M.p.=184.0° C.;
Enthalpy of fusion ΔH=110 J/g

Example 13

2800 ml of White® D25 solvent (hydrocarbon fraction supplied by Districhimie), 899 g of dry lauryllactam (lactam-12), 14.4 g of N,N'-ethylenebisstearamide (EBS) and 1.44 g of silica with a mean diameter of 4.3 μm, sold by Grace under the name Syloid® ED2, are successively introduced into a 5 liter metal reactor equipped with a paddle stirrer, a jacket in which heating oil circulates, a system for emptying via the bottom, a lock chamber for introducing the reactants and a device for vacuum azeotropic distillation, which reactor is swept by a stream of dry nitrogen.

The reaction mixture is stirred at a speed of 500 revolutions/min and then gradually heated from ambient temperature to 110° C. over 30 min. 290 ml of solvent are distilled off under a vacuum of $2.66 \times 10^4$ Pa in order to azeotropically entrain any trace of water. The reactor, still with stirring, is brought back to atmospheric pressure and the temperature is brought back to 105° C. 1.8 g of 60% by weight sodium hydride dispersed in oil are then introduced and the stirring is reduced to 500 revolutions/min for 30 min.

27.6 g of stearyl isocyanate are continuously injected over 3 h and then the mixture is brought to 110° C. for 1 h.

The reaction mixture is cooled to 80° C. and exists in the form of a slurry which is drawn off via the bottom of the reactor and which comprises the solvent, the unreacted starting reactants and the polyamide-12 powder formed.

After filtering off and drying, a polyamide-12 powder is obtained which is composed of spheroidal particles.

Example 14

The operating conditions of example 13 are repeated but by replacing the Syloid® ED2 silica with 0.72 g of the Syloid® ED5 silica sold by Grace.

After filtering off and drying, a polyamide-12 powder is obtained which is composed of spheroidal particles.

Example 15

The operating conditions of example 13 are repeated but while replacing the Syloid® ED2 silica with Syloid® C807 silica sold by Grace.

After filtering off and drying, a polyamide-12 powder is obtained which is composed of spheroidal particles.

Particle Sizing of the Powders Obtained

The powders obtained in examples 1 to 15 are analyzed using a Coulter LS230 particle sizer. It makes it possible to obtain the particle size distribution of the powders, from which it is possible to determine:
the mean diameter,
the width of the distribution or the standard deviation of the distribution.

The particle size distribution of the powders according to the invention is determined according to the standard techniques using a Coulter LS230 particle sizer from Beckman-Coulter. From the particle size distribution, it is possible to determine the volume mean diameter with the logarithmic calculation method, version 2.11a of the software, and the standard deviation, which measures the narrowing of the distribution or the width of the distribution about the mean diameter. It is one of the advantages of the process described here to make it possible to obtain a narrow distribution (small standard deviation) with respect to the mean diameter. This standard deviation, which appears in the final column of table I, is calculated using the logarithmic statistical calculation method, version 2.11a of the software. It is between 1.1 and 1.3, indeed even often less than 1.2.

It is found, in FIG. 1, that an inorganic filler according to the invention makes it possible to obtain polyamide-12 particles with a greater mean diameter and also with a narrower particle size distribution than a finely divided inorganic filler. This would also be true for polyamide 6, 6/12 and for a copolyesteramide.

TABLE I

| Example | Inorganic filler | Weight of inorganic filler introduced [g] | Stirring speed [revolutions/min] | Volume mean diameter of the particles of powder obtained [μm] | Standard deviation [%] |
|---|---|---|---|---|---|
| 1 | Sipernat® 320 DS | 0.36 | 500 | 53.6 | 1.17 |
| 2 (comp.) | Aerosil® R 972 | 0.36 | 500 | 46.4 | 1.22 |
| 3 (comp.) | Aerosil® R 972 | 0.36 | 550 | 42.2 | 1.19 |
| 4 | Sipernat® 320 DS | 0.36 | 550 | 61.3 | 1.15 |
| 5 | Sipernat® 320 DS | 0.72 | 450 | 55.8 | 1.17 |
| 6 | Sipernat® 50 S | 0.72 | 450 | 69.4 | 1.18 |
| 7 (comp.) | Aerosil® R 972 | 0.36 | 400 | 56.2 | 1.18 |
| 8 | Sipernat® 320 dS | 0.36 | 400 | 62.7 | 1.17 |
| 9 (comp.) | Aerosil® R 972 | 0.36 | 350 | 56.5 | 1.23 |
| 10 | Sipernat® 50 S | 0.36 | 350 | 71.2 | 1.22 |
| 11 | Sipernat® 320 DS | 0.36 | 400 | 47.8 | 1.29 |
| 12 (comp.) | Aerosil® R 972 | 0.36 | 400 | 26.4 | 1.26 |
| 13 | Syloid® ED2 | 1.44 | 500 | 65.1 | 1.18 |
| 14 | Syloid® ED5 | 0.72 | 500 | 70.6 | 1.15 |
| 15 | Syloid® C807 | 1.44 | 500 | 64.3 | 1.19 |

What is claimed is:

1. A process for the production of polyamide or copolyesteramide powder particles comprising the steps of
   a) admixing into a reaction medium an inorganic filler with a mean diameter of between 1 and 30 μm, and at least one polymerizable monomer; and
   b) polymerizing said admixture, resulting in powder particles having a mean diameter of between 60 and 150 μm and a standard deviation of 1.22 or less.

2. The process as claimed in claim 1, wherein the polyamide or copolyesteramide powder particles have a mean diameter of between 60 and 100 μm.

3. The process as claimed in claim 1, wherein the polyamide or copolyesteramide powder particles have a spheroidal shape.

4. The process as claimed in claim 1, wherein the mean diameter of the inorganic filler is between 2 and 20 μm.

5. The process as claimed in claim 4, wherein the mean diameter of the inorganic filler is between 3 and 11 μm.

6. The process as claimed in claim 5, wherein the mean diameter of the inorganic filler is between 4 and 8 μm.

7. The process as claimed in claim 1, wherein the inorganic filler is chosen from silicas, aluminosilicates, aluminum oxides or alumina and/or titanium dioxide.

8. The process as claimed in claim 7, wherein the inorganic filler is a silica.

9. The process as claimed in claim 8, wherein the silica is chosen from the silicas manufactured according to a precipitation process.

10. The process as claimed in claim 8, wherein the silica is chosen from the silicas sold under the trade name SIPERNAT® 320 DS or SIPERNAT® 50 S from Degussa or from the silicas sold under the trade name SYLOID® 807, SYLOID® ED2 or SYLOID® ED5 from Grace.

11. The process as claimed in claim 1, wherein the ratio by weight of the inorganic filler with respect to the polymerizable monomer or monomers is between 10 and 50 000 ppm.

12. The process as claimed in claim 1, wherein the polymerizable monomer or monomers is or are chosen from lauryllactam, caprolactam, enantholactam and capryllactam.

13. The process as claimed in claim 1, wherein the polymer particles are made of polyamide 12, polyamide 6 or polyamide 6/12.

14. The process as claimed in claim 1, wherein a mixture comprising, in molar %, the total being 100%:
   from 1 to 98% of a lactam chosen from lauryllactam, caprolactam, enantholactam and capryllactam;
   from 1 to 98% of a lactam, other than the above, chosen from lauryllactam, caprolactam, enantholactam and capryllactam;
   from 1 to 98% of a lactone chosen from caprolactone, valerolactone and butyrolactone,
is polymerized.

15. The process as claimed in claim 1, wherein at least one N,N'-alkylenebisamide is added to the reaction medium.

16. The process as claimed in claim 1, wherein use is made, as solvent, of a paraffinic hydrocarbon fraction, the boiling range of which is between 120 and 170° C.

17. The process as claimed in claim 11, wherein the ratio by weight of the inorganic filler with respect to the polymerizable monomer or monomers is between 100 and 20 000 ppm.

18. A process for the production of polyamide or copolyesteramide powder particles having a mean diameter of between 60 and 100 μm, the process consisting of:

a) adjusting the mean diameter of the powder particles to be within the range of 60 and 100 μm by admixing at least one inorganic filler with a mean diameter of between 2 and 20 μm, at least one polymerizable monomer, and a reaction medium;
b) maintaining a mixing speed at or above 350 revolutions/minute; and
c) polymerizing the admixture.

* * * * *